United States Patent [19]

Sciacero et al.

[11] Patent Number: 4,859,814
[45] Date of Patent: Aug. 22, 1989

[54] NOISE CANCELLATION IN DIGITIZING SYSTEM AND METHOD

[75] Inventors: James R. Sciacero, Scottsdale; Charles A. Waterbury, Chandler, both of Ariz.

[73] Assignee: Kurta Corporation, Phoenix, Ariz.

[21] Appl. No.: 238,040

[22] Filed: Aug. 29, 1988

[51] Int. Cl.⁴ ............................................. G08C 21/00
[52] U.S. Cl. ........................................ 178/19; 382/59
[58] Field of Search ..................... 178/18, 19; 340/706; 382/59

[56] References Cited

U.S. PATENT DOCUMENTS 4,736,073  4/1988  Abernethy ............................ 178/19
4,794,208  12/1988  Watson ................................ 178/19

Primary Examiner—Stafford D. Schreyer
Attorney, Agent, or Firm—Cahill, Sutton & Thomas

[57] ABSTRACT

A digitizing system includes a differential noise reduction technique wherein spaced parallel grid conductors in a tablet are differentially sensed in order to cancel out locally induced noise signals. Grid conductors also are sensed in a single ended fashion to initially locate a grid conductor conducting a larger induced carrier signal amplitude than any other grid conductor and produce amplitude data that is used to eliminate ambiguities arising from differential sensing of pairs of spaced grid conductors.

14 Claims, 5 Drawing Sheets

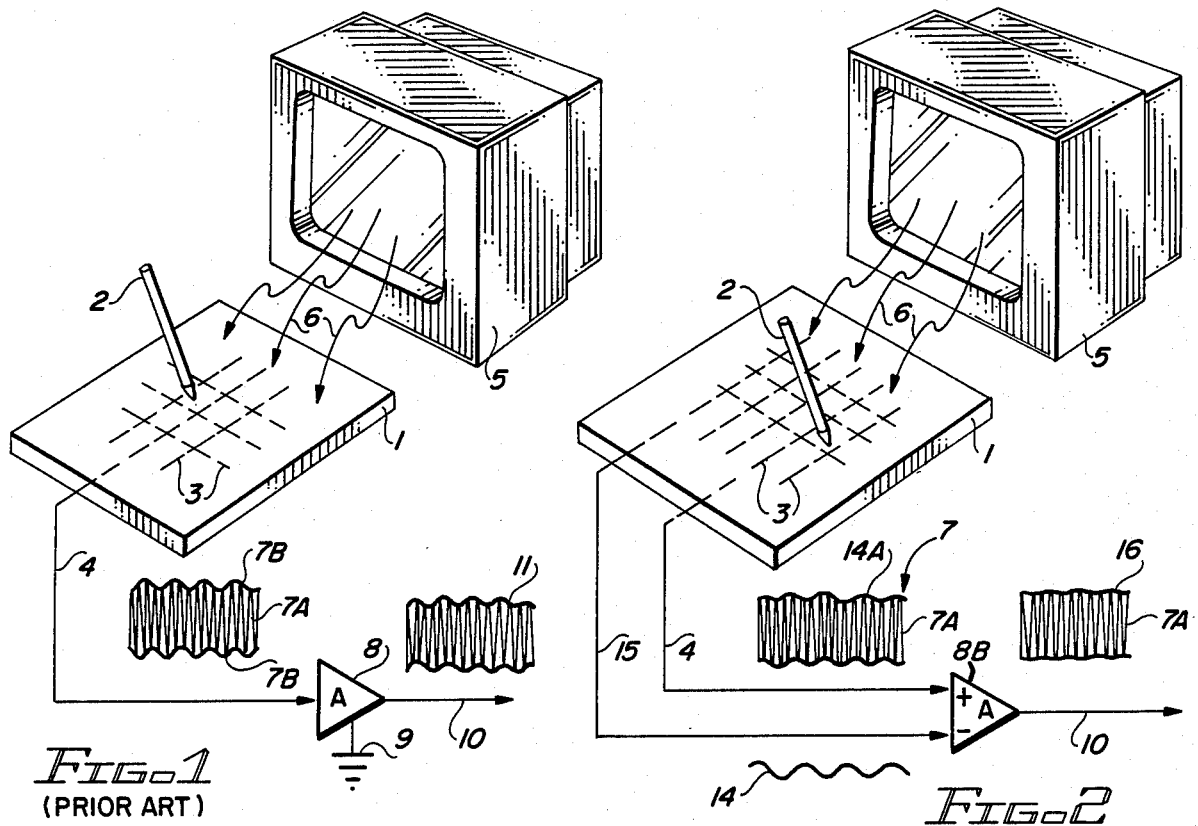
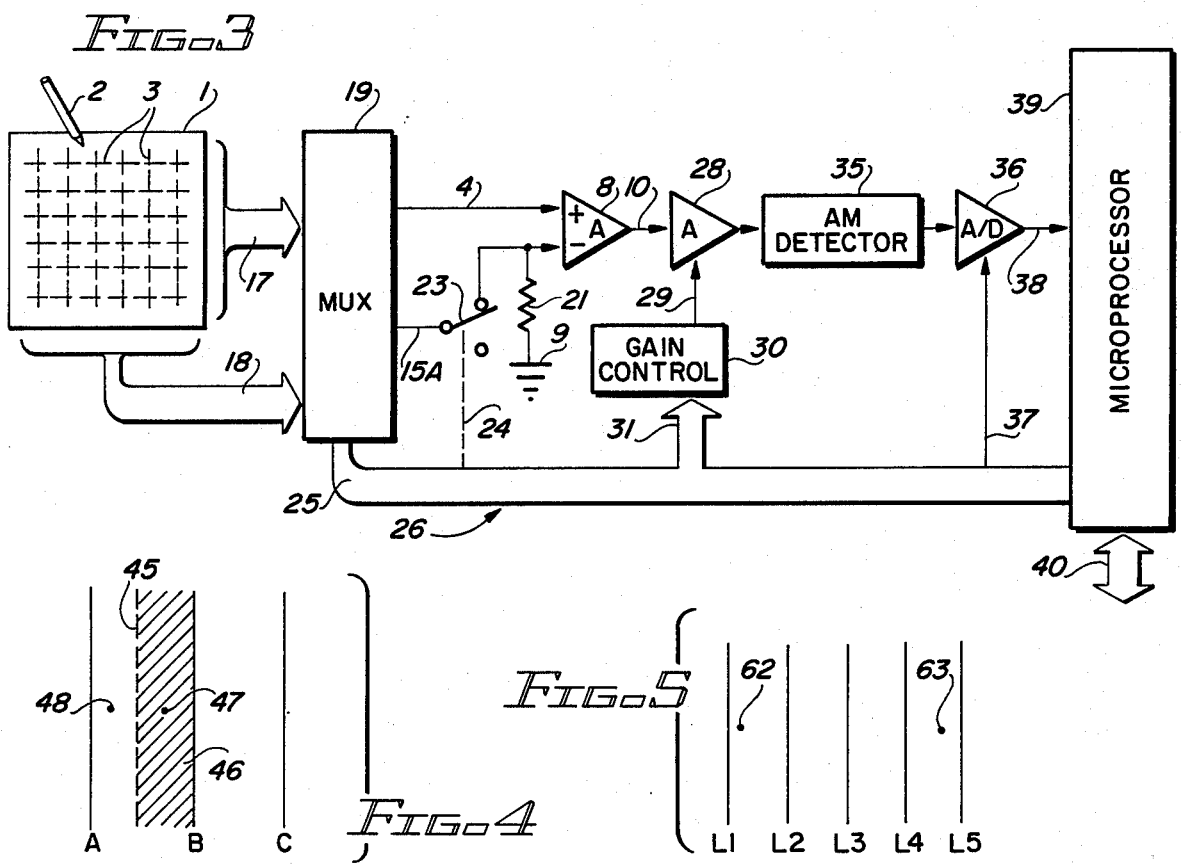

NOISE CANCELLATION IN DIGITIZING SYSTEM AND METHOD

BACKGROUND OF THE INVENTION

The invention relates to digitizing systems and techniques including pointing devices such as cursors and pens that transmit carrier signals which are received by a grid of X and Y conductors in a platen surface to produce digital data representative of cursor or pen location, and more particularly to improved techniques for reducing or eliminating effects of high levels of ambient noise.

The prior art of digitizing tablets includes a wide variety of system approaches which typically include transmission of a carrier signal from a pointing device. The pointing device can be cordless or connected by a cord to a suitable carrier signal generator. The transmitted carrier signal induces carrier signals in X and Y grid conductors. Position information of the pointing device is determined by scanning the X,Y grid conductors, and sensing, amplifying, and processing the amplitudes of the scanned X and Y grid conductors to derive data corresponding to the present position of the pointing device. The prior art also includes systems that transmit from the grid in a time scanned fashion, rather than transmitting from the pointing device. Such systems receive the signal in a single antenna located in the pointing device.

Both types of prior digitizing systems are susceptible to errors caused by electronic interference generated nearby and radiated into the antenna system of the digitizing tablet. This is particularly true if the digitizing system is implemented using electrostatic means of signal transmission, since the antenna impedances are higher in such systems and are more subject to receiving larger noise signals in the presence of radiated noise. Although electrostatic digitizing systems generally utilize much smaller signals and less power than magnetic digitizing systems, particularly for cordless pointing devices, magnetic digitizing systems nevertheless do "pick up" ambient electrical noise, and digitizing performance can be degraded. Any noise that is superimposed upon the pointing device signals or the resulting X and Y grid conductor carrier signals is likely to produce digitizing errors or command errors. One common source of high noise interference is computer monitors. Recently available monitors generate high levels of noise that is in the spectrum of operation of digitizing systems. Modern high resolution computer monitors generate noise in the spectrum of about 15 kilohertz to 150 kilohertz. (This frequency band is not protected by RFI emission regulation requirements of the Federal Communications Commission.) Since there are no such RFI emission limits, it is becoming increasingly difficult for digitizing systems to find an interference-free spectrum in which to operate a digitizing tablet. The monitor noise causes amplitude modulation of the signals received from the pointing device. Since amplitude information of the scanned X,Y conductors is used to derive X and Y coordinates of the pointing device, the amplitude modulation can introduce errors into the pointing device position data. Consequently, the noise produced by the monitor 5 usually manifests itself as "jitter" in the pointing device position data.

Prior methods for reducing the effects of such high noise interference include increasing the transmission power of the digitizing system or finding an interference-free frequency band for operating the digitizing system. However, increasing power of transmission of the digitizing system generally is undesirable because of the accompanying increased circuit complexity and increased power consumption of the system, and interference-free frequency bands are becoming less and less available.

FIG. 1 illustrates the above problem, wherein a typical prior digitizing tablet 1 operates in conjunction with a pointing device 2 which transmits electrostatic signals that are detected by X and Y grid conductors such as 3. A high resolution monitor 5 generates electrostatic and electromagnetic noise 6 which induces noise signals in the various X and Y grid conductors 3. Grid conductor scanning circuitry (not shown) multiplexes a selected grid conductor to a signal conductor 4, which is connected to an input of a preamplifier 8A which is referenced to a ground conductor 9. Reference numeral 7 illustrates a typical waveform appearing on conductor 4, including the detected high frequency carrier signal and with a low frequency modulating envelope 7A produced by the noise 6. Both the detected grid conductor carrier signal and the noise-produced modulation appear on the output conductor 10, which is input to suitable analog-to-digital conversion circuitry and amplitude processing circuitry to generate X,Y coordinate data for pointing device 2 and/or frequency discriminated command signals produced in response to switches on pointing device 2. Numeral 11 shows the signal on amplifier output conductor 10, containing both the digitizer carrier signal and the noise-induced modulation 7A.

It is believed there would be a very large market for a low cost graphics input system that could operate in a high-noise environment, especially such a system that would be suitable for use in tablets or digitizing systems utilizing increasing popular cordless pointing devices.

SUMMARY OF THE INVENTION

Accordingly, it is an object of the invention to provide a low cost graphics tablet system that operates accurately in a high noise environment.

It is another object of the invention to provide a digitizing system which effectively detects and cancels ambient noise from detected grid carrier signals before processing amplitudes thereof to compute coordinates of a pointing device.

Briefly described, and in accordance with one embodiment thereof, the invention provides a digitizing system employing a differential noise reduction technique. The digitizing system includes a pointing device which transmits a carrier signal which may have superimposed thereon locally induced noise signals, a series of X and Y conductors arranged as a grid in a tablet or platen receiving the transmittal carrier signals and locally induced noise signals, multiplexing circuitry for canning the X and Y lines by pairs through multiplexing circuitry under control of a microprocessor, a switch to disable differential reading of the grid to effectuate "coarse" location of the pointing device and then effectuate differential sensing of pairs of grid conductors with one conductor of each pair carrying noise signals and the other carrying the noise signals plus the carrier signal received from the pointing device, a microprocessor controlled gain adjustment amplifier, signal detection circuitry, analog-to-digital conversion circuitry, and a microprocessor which controls the multiplexing circuits, calculates position data, and communicates with a host computer system. The grid conductors are scanned under control of the microprocessor to measure the relative signal strength on each grid conductor. When a grid conductor is selected for sensing, another grid conductor located a certain number of grid conductors away from the first also is selected as a reference conductor of the pair of differentially sensed grid conductors. The output of a sensing differential amplifier is processed in a conventional fashion to compute data representing the present coordinates of the pointing device. A technique of momentarily disabling the differential sensing of pairs of grid lines and performing single ended readings of the grid conductor signals eliminates ambiguity associated with differential sensing of pairs of grid conductors. The described system allows relatively simple, low power signal processing techniques to be employed in implementation of a high performance digitizing system in a high noise environment typical of today's modern computer monitors and peripheral equipment.

BRIEF DESCRIPTION OF THE DRAWINGS

FIG. 1 is a schematic diagram useful in describing the prior art.

FIG. 2 is a schematic diagram useful in describing the basic concepts of the present invention.

FIG. 3 is a detailed block diagram of the circuitry of the present invention.

FIG. 4 is a diagram useful in explaining a position determination technique of the present invention.

FIG. 5 is another diagram useful in explaining a position determination technique in accordance with the present invention.

BRIEF DESCRIPTION OF THE PREFERRED EMBODIMENTS

Figure 6:
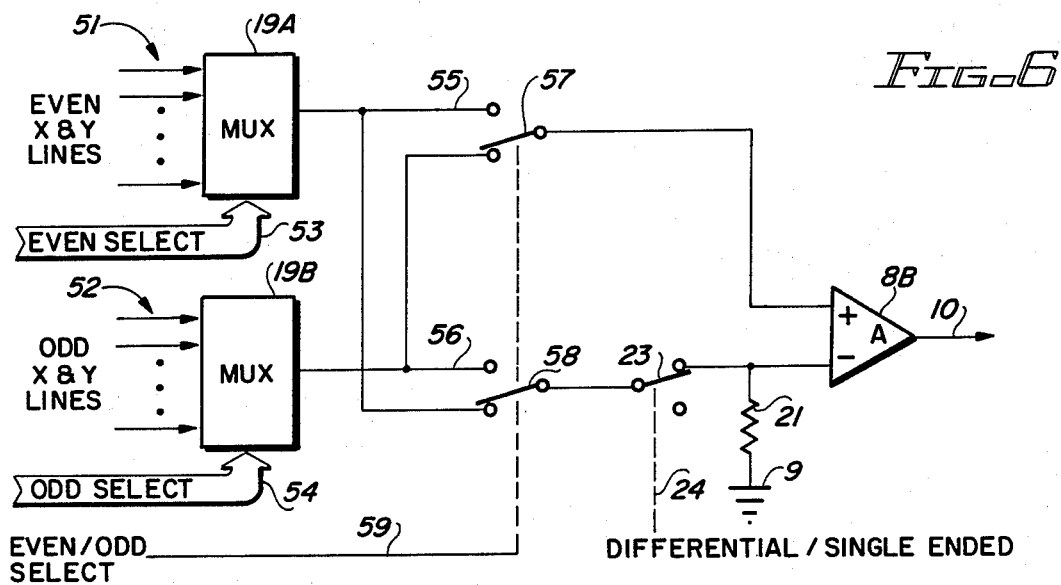
FIG. 6 is a block diagram useful in further explaining the digitizing system of FIG. 2.

Referring now to FIG. 2, the basic concept of the present invention can be seen by noting that a noise reference conductor 15 is connected to the inverting input of a differential amplifier 8B. Noise reference conductor 15, rather than ground conductor 9 (as in FIG. 1) is used as the amplifier input reference. Reference conductor 15 is a selected one of the grid conductors 3, selected as one line of a two line pair, the difference between which is measured by differential amplifier 8B. In accordance with the present invention, the reference conductor 15 receives essentially the same noise signal 14 as the signal line 4 which is closest t the signal radiating tip of the pointing device 2. Detailed circuitry can be provided for pointing device 2 by those skilled in the art, as disclosed in various references, such as commonly assigned U.S. Pat. No. 4,672,154 "Low Power, High Resolution Digitizing System With Cordless Pen/Mouse", by Rodgers et al., incorporated herein by reference. Thus, signal line 4 conducts the carrier frequency transmitted by pointing device 2, as indicated by 7A, and also conducts a noise-modulated envelope designated by 14A. If the amplitude of the nose modulated envelope 14A is the same as the noise signal 14 on reference conductor 15, differential amplifier 8B automatically cancels the noise-modulating envelope of the signal 7 on signal line 4, producing an unmodulated carrier signal 7A as the signal 16 on amplifier output conductor 10. The erroneous noise signal is therefore subtracted from the signal line 4 coupled to the presently scanned grid conductor. Therefore, amplitude information, after being converted to a digital representation thereof by an analog-to-digital converter, can be utilized to accurately locate the tip of pointing device 2 without jitter caused by noise 6 generated by monitor 5.

FIG. 3 shows a detailed diagram of a presently preferred embodiment of the digitizing system of FIG. 2. Numeral 17 designates a number N of X grid lines, and numeral 18 designates a number N of Y grid lines. A grid line selection circuit 19 is controlled by microprocessor 39, which produces grid selection signals 25 on microprocessor control bus 26. The presently selected X or Y line multiplexed onto signal line 4 is coupled to the positive input of amplifier 8, as previously explained. In accordance with the present invention, the inverting input of amplifier 8 is not always connected to the noise reference line 15 being scanned with the present signal line, but sometimes is connected to ground conductor 9 via pulldown resistor 21, depending on the position of switch 23, which is controlled by microprocessor 39 and the enable/disable signal 24 of bus 26.

As subsequently explained in more detail, "coarse" determination of the location of pointing device 2 is accomplished by "single ended" scanning of X and Y grid lines, rather than differential sensing of pairs of them.

The amplifier output signal on conductor 10 is applied to the input of a variable gain amplifier 28, the gain of which is controlled by a gain control signal on conductor 29. Microprocessor 39 and gain control network 30 operate to adjust the gain of amplifier 28 in response to a digital signal on the conductors 31 for the purpose of keeping the detected signal level in a desired operating range of analog-to-digital converter 36. The output o amplifier 28 is applied as an input to a conventional amplitude modulation detector circuit 35. The output of amplitude modulation detector 35 is applied to the analog input of analog-to-digital converter 36, which is sampled in accordance with a control signal produced on conductor 37 by microprocessor 39. A digital data output on bus 38 is read by microprocessor 39, which executes the algorithm indicated in the flow chart of FIG. 7 and feeds the resulting data to a host computer (not shown). Gain control network 30 and amplitude modulation detector 35 can be easily provided by one skilled in the art, so detailed circuit diagrams are not included herein. Such circuitry can be found in the assignee Kurta Corporation's model "IS/ONE" Digitizing System.

FIG. 6 shows a practical implementation of the grid line selection circuitry 19, wherein numeral 19A designates a multiplexer in which all even numbered X and Y grid conductors are supplied as inputs. Multiplexer 19A produces on analog output 55 equal to the signal on the presently selected even numbered line 51. Numeral 53 designates conductors carrying a digital word that selects one of conductors 51. Similarly, multiplexer 19B produces the analog signal 56 carried on the presently selected odd numbered X or Y grid conductor 52 in response to a digital word 54. The outputs of multiplexers 19A and 19B are further multiplexed into the noninverting and inverting inputs of amplifier 8B by a pair o ganged switches 57 and 58, which perform the function of directing signal and reference lines to the appropriate inputs of the differential amplifier 8B. For differential sensing of an X or Y grid conductor that serves as a signal line and a separate X or Y grid conductor that functions as a noise reference line, a signal on conductor 24 causes switch 23 to couple the wiper of switch 58 to the inverting input of amplifier 8. The opposite state of switch 23 disconnects the inverting input of amplifier 8 from switch 58, so pull down resistor 21 grounds the inverting input of amplifier 8, and single ended sensing of individual X and Y grid conductors is carried out to provide the above mentioned "coarse" determination of the position of pointing device 2.

In understanding operation of the digitizing system of FIGS. 2 and 3, it should be noted that the noise 6 ordinarily is induced as "common mode" noise in all grid lines 3. This allows the above described differential method of reading the grid conductors to cancel the unwanted noise.

It should be noted that the reference line 15 could be connected to a "noise antenna" other than another grid. That is, the noise reference voltage could be detected by any antenna which is positioned to sense the noise environment which induces the noise signal in the grid conductors 3.

Referring to FIG. 3, the operation of switch 23 to disable differential reading of pairs of grid conductors spaced by an odd number of conductors allows the position determining algorithm executed by microprocessor 39 to unambiguously determine the correct position of pointing device 2. As described in more detail in commonly assigned U.S. Pat. No. 4,616,106, entitled "Graphic Tablet and Method", issued on Oct. 7, 1986, by Fowler et al., incorporated herein by reference, pointing device position is determined by the relative magnitudes of the respective signals of each grid line measurement. The grid line with the largest signal strength represents the line which the pointing device is presently closest to. Using another grid line as the noise signal line to cancel noise-induced modulation on the grid line with the largest signal strength presents an ambiguity as to which line has the largest amplitude signal because the differential measurement technique described above produces the magnitude of the difference between the intensity of the signal on the grid line under test and the grid line selected as the noise reference line. The reason the ambiguity occurs is because it cannot be determined if the pointing device 2 is closer to the selected grid conductor or to the selected reference line.

FIG. 5 shows an example of the ambiguity associated with the differential method of reading the grid. When a grid line pair including line L1 and line L5 are selected and applied to the differential amplifier 8, a pointing device 2 located at either point 62 near line L1 or point 63 near line L5 will produce the same magnitude difference signal.

In the presently preferred embodiment of the invention, relative "single ended" signal strengths of both the selected signal grid line and the selected reference grid line are compared to resolve the above ambiguity.

In the presently preferred embodiment of the differential method of reading intensities of the carrier signal on grid conductor lines 3, each grid line used as a reference line for the purpose of sensing the noise signal also being induced in a selected signal line is four inches (5 lines) away from the selected line. This distance was experimentally determined to be a good compromise in that the pickup of noise 6 in such a reference line was good enough to produce excellent cancellation of noise in the selected signal line. The transmitted carrier signal pickup by that reference line from the pointing device 2 was found to be small enough so as to not cancel out a significant amount of the desired carrier signal amplitude in the selected test line. Normal amplification, analog-to-digital conversion, and computation of pointing device coordinates result in excellent, jitter-free digitizing of the position of pointing device 2 in a high noise environment producing large noise signals in the 15 kilohertz to 150 kilohertz spectrum.

Figure 7:
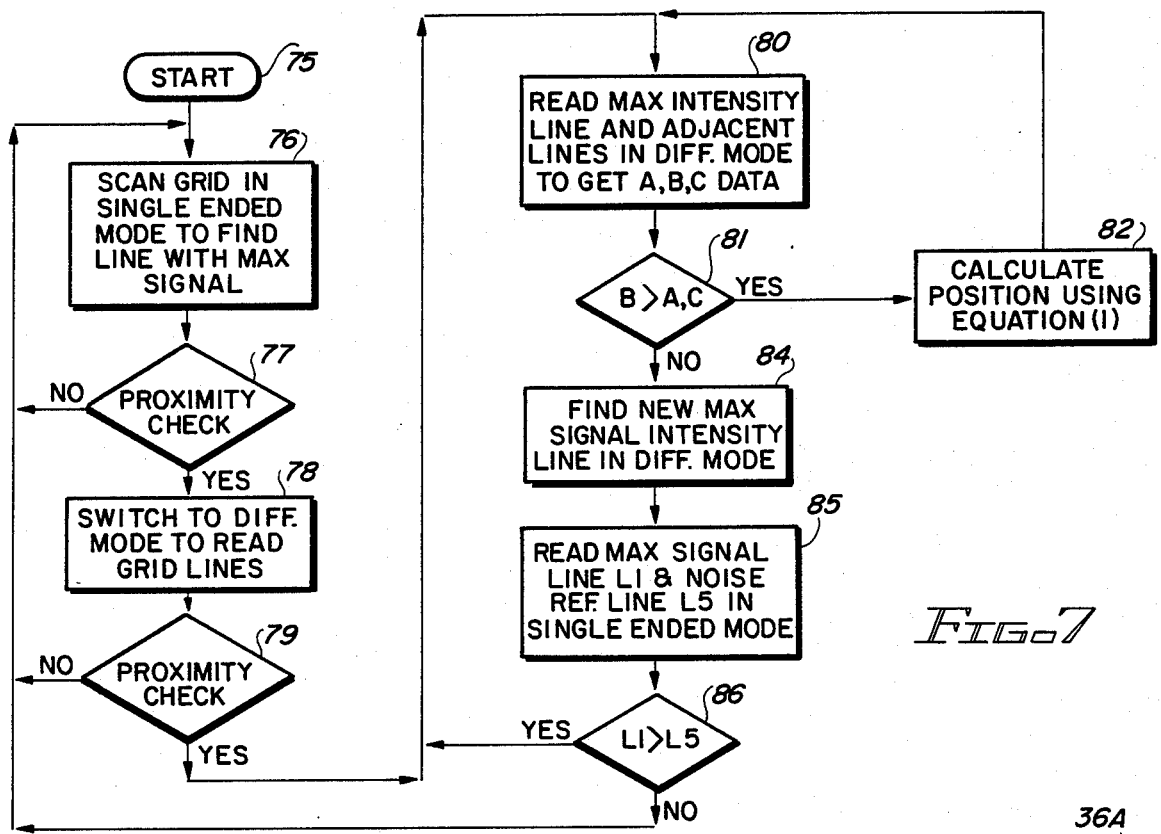
FIG. 7 is a flow chart useful in explaining the signal amplitude processing algorithm executed by the micoprocessor in FIG. 3.

The position determination algorithm of FIG. 7 scans the grid lines in sequence and finds the grid test line having the largest signal to effectuate a "coarse" determination of the X and Y coordinates of pointing device 2. The "fine" position of pointing device 2 then is determined by differential sensing of pairs of the test grid conductors in the "neighborhood" of the largest signal and ratiometrically processing the data from these three lines. More specifically, in FIG. 4, three grid lines A, B, and C are shown. For example, if grid line B has the largest signal amplitude, and the amplitude of the signal on conductor A is larger than that of conductor C, then the precise position of pointing device 2 relative to grid conductor B is in the shaded region 46 between line B and the midpoint between lines A and B, and is determined by the equation:

$$\left[\frac{A-C}{B-C}\right] \cdot [1/2 \text{ of grid line spacing}].$$

The grid line spacing can be 0.5 inches.

In the method described above, the differential readings are taken of pairs of grid conductors spaced four inches apart. The reference line supplies noise cancellation, as described above. The readings obtained from the output of amplifier 10 then are treated as single ended readings.

Another embodiment of the invention involves using the differential method of reading differential data from adjacent grid conductors to directly obtain data necessary for calculating the precise position of the pointing device relative to the test conductor (i.e., conductor B) having the largest carrier signal amplitude. The pointing device position can be achieved in accordance with the following formula to utilize the differential measurements $(A-B)$ and $(C-B)$ in accordance with the following equation:

$$\frac{(A-B)-(C-B)}{-(C-B)} = \frac{A-C}{B-C}, \quad (2)$$

which is the desired ratiometric equation for calculating pointing device position relative to line B.

Using the differential data from adjacent line pairs in this fashion has the advantage of maximizing the noise cancellation capabilities of the differential noise cancellation technique, because noise radiated into the grid conductors 3 is maximum in the neighborhood of the pointing device due to the effects of the user's hands, etc., especially for cordless cursors or pens. Therefore, the noise induced in the reference grid conductor is more likely to be equal to the noise induced in the signal grid line being read and therefore produce maximum cancellation. However, this technique is limited to signal processing and amplitude detection techniques that preserve the algebraic sign or polarity of the differential measurement.

Sychronous amplitude demodulating techniques that are sensitive to the phase of the input carrier are an example of a method to preserve algebraic sign information.

FIG. 7 is a flowchart of a program executed by microprocessor 39 to perform the single ended and differential scanning operations described above. The position determination and tracking algorithm executed by microprocessor 39 starts at label 75. In block 76 the system begins its continuous scanning with switch 23 (FIG. 3) open, so that resistor 21 pulls the inverting input of amplifier 8 to ground. Both X and Y conductors 17 and 18 are continuously scanned as microprocessor 39 looks for the X conductor and Y conductor with the largest detected signals, respectively. Once the X grid conductor or Y grid conductor with the largest signal intensity is found, the program goes to decision block 77 and performs a "proximity check" to determine if that signal amplitude is within a predetermined range, for example to ensure that the transmitting tip of the pointing device 2 is no further than about five eighths of an inch from the tablet surface. If this criteria is not met, the program returns to block 76 and continues single ended scanning of the grid conductors 17 and 18. If the determination of the decision block 77 is affirmative, the program goes to block 78 and causes switch 23 of FIG. 3 to connect the inverting input of amplifier 8 to conductor 15A so that differential sensing of the grid conductors can be accomplished. Then the detected signal on conductor 4 is referenced to a noise reference signal on conductor 15A, which, as previously explained, is connected by multiplexer 19 to a grid conductor five grid lines away from the grid conductor presently coupled by multiplexer 19 to the signal line 4.

The program then goes to decision block 79 and conducts another proximity check, this time between the grid conductors found during single ended mode scanning to have the largest detected X and Y signals. This is done for the purpose of eliminating false "lock on" noise signals. (It is possible that if a large level of uniformly distributed noise was transmitted into the tablet, the proximity check of block 77 might be met for single ended scanning but might fail the differential mode measurement of the proximity check of decision block 79.) If the determination of decision block 79 is negative, the program returns to block 76 and switches back to single ended mode scanning.

If the determination of block 79 is affirmative, the program goes to block 80 where the grid conductors on either side of the X grid conductor having the maximum detected signal are sensed in the differential mode and the Y grid conductors on either side of the Y grid conductor having the maximum detected signals, respectively, are also read by microprocessor 39. Thus, three largest differential intensity readings are obtained for X grid conductors in the vicinity of pointing device 2 and three largest differential intensity readings are made for the three Y grid conductors closest to the transmitting antenna of the pointing device 2. For each of these sets of X or Y grid conductors, the largest measured intensity value is designated $B_X$ or $BY$, the next largest intensity value is designated $A_X$ or $B_X$, and the smallest is designated $C_X$ or $C_Y$. The program then goes to decision block 81 and determines if $B_X$ is greater than both $A_X$ and $C_X$, or if $B_Y$ is greater than both $A_Y$ and $C_Y$.

The purpose of this determination is to find out if the pointing device 2 has moved during the execution of the position determination and tracking algorithm so that the X and Y grid conductors most recently determined in block 76 to have the maximum detected values now no longer have the prior maximum detected signal amplitudes. (If the ambiguity test of block 86 is failed it means that tracking of the signal produced by the pointing device has been lost so it is necessary to go back and rescan the entire grid. This can happen if the operator moves the pointing device too fast.) If this determination is affirmative, it means that the pointing device 2 has not moved, and the program goes to block 82 and calculates the position of pointing device 2 in accordance with equation (1), and goes back to block 80. This loop continues until the pointing device moves and a negative determination is obtained from decision block 81.

Then the program goes to block 84 and a new pair of X and Y grid conductors having maximum amplitudes are found, this time with switch 23 in the differential mode position. The program then goes to block 85 and reads the intensity of the new X or Y grid conductor having the maximum intensity relative to the associated parallel grid conductor five lines away, which is being used as a noise reference conductor. For example, if the maximum signal line read in block 85 is line L1 in FIG. 5, then L5 is the associated noise reference conductor. Both of these two lines are read with switch 23 in the single ended mode position. The program then goes to decision block 86 and performs a check to resolve the previously described possible ambiguity by determining if the signal intensity of line L1 exceeds that of line L5. If this determination is negative, the ambiguity check has been failed, and the program then returns to block 76 and begins the entire process over again. If the determination of decision block 86 is affirmative, the ambiguity test has been passed, and the program returns to block 80 to read new values of $A_X$, $A_Y$, $B_X$, $B_Y$, and $C_X$, $C_Y$ so that the new position of the pointing device 2 can be accurately calculated.

Figure 8:
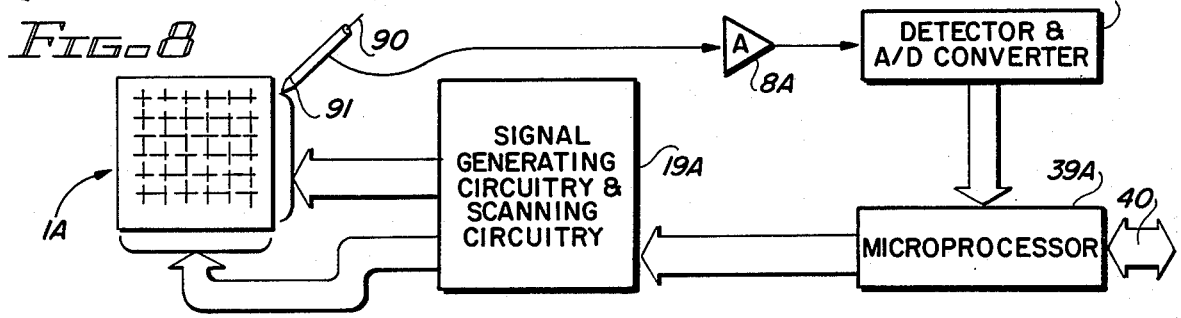
FIG. 8 is a diagram of a digitizing system of the type that transmits carrier signals from grid conductors in a tablet to a pointing device, and incorporates the noise cancellation feature of the invention.

Although pointing device 2 in the above described embodiments of the invention transmits a signal which is detected by the grid conductors 3, it is possible for the grid conductors to act as transmitters and the receiving and detecting circuitry can be contained in or connected to pointing device 2. The noise cancellation feature of the above invention nevertheless can be used. FIG. 8 shows a block diagram of a system in which signal generating and scanning circuitry 19A transmits signals in a scanned fashion to the X and Y grid conductors in tablet 1A, which then are received by an antenna 91 in pointing device 2A. Pointing device 2A also includes a noise reference antenna 90 located as far as practicable from the receiving antenna 91 of pointing device 2A. The noise reference signal and the output of the signal receiving antenna of pointing device 2A then can be fed into an amplifier 8A in either a single ended or differential mode as described above. The amplified results can be fed into signal processing circuitry 36A which includes a suitable detector and analog-to-digital conversion circuitry the outputs of which are fed into microprocessor 39A in a manner quite analogous to that described above. The microprocessor 39A can control the signal scanning, if desired.

While the inventio has been described with respect to several specific embodiments, those skilled in the art can make various modifications which are sufficiently equivalent to the described embodiments to be within the true spirit and scope of the invention.

What is claimed is:

1. A method of reducing effects of ambient electrical noise in a digitizing system, the method comprising the steps of:
    (a) transmitting a carrier signal from a pointing device to a plurality of grid conductors in a tablet;
    (b) inducing a portion of the transmitted carrier signal in a first grid conductor close to the pointing device and also inducing a portion of the ambient electrical noise in the first grid conductor;
    (c) simultaneously with step (b), inducing a portion of the electrical noise in a noise reference conductor located away from the pointing device;
    (d) differentially sensing the first conductor and the noise reference conductor to produce an output carrier signal representative of the closeness of the first conductor to the pointing device or a command from the pointing device without appreciable amplitude modulation of the output carrier signal due to the ambient electrical noise;
    (e) conducting the output carrier signal to a tablet processing circuit which operates on the output carrier signal to determine a location of the pointing device relative to the tablet or discriminate a command represented by the frequency of the output carrier signal.

2. The method of claim 1 wherein step (c) includes inducing the portion of the ambient electrical noise in a second grid conductor parallel to and spaced from the first grid conductor by a predetermined distance.

3. The method of claim 2 wherein the second grid conductor is located approximately four inches from the first grid conductor, the method including single endedly sensing the grid conductors to locate at least three grid conductors in a neighborhood of the pointing device and conducting carrier signals modulated by the ambient electrical noise to the tablet processing circuit to determine which grid conductors are in the neighborhood of the pointing device.

4. The method of claim 3 including operating on the amplitudes of the single endedly sensed grid conductor signals to eliminate ambiguities arising from the differential sensing of the parallel first and second grid conductors.

5. A method of reducing effects of ambient electrical noise in a digitizing system, the method comprising the steps of:
    (a) sensing a plurality of parallel grid conductors, including first, second, and third grid conductors in a single ended mode to obtain intensities of carrier signals induced in the grid conductors, respectively, by a pointing device, the induced carrier signal in the first grid conductor having greater intensity than the induced carrier signals in any of the other grid conductors, the second and third grid conductors being located adjacent to and on opposite sides of the first grid conductor;
    (b) differentially sensing the intensities of the induced carrier signals in the first, second, and third grid conductors relative to the fourth, fifth, and sixth grid conductors, respectively, the fourth, fifth, and sixth grid conductors being located a preselected distance from the first, second and third grid conductors, respectively;
    (c) computing a position of the pointing device from the differentially sensed intensities.

6. The method of claim 5 including, after step (b), determining if the intensity of the induced carrier signal in the first grid conductor is greater than that of both the second and third grid conductors, and if it is, performing step (c) and the returning to step (b).

7. The method of claim 6 wherein if the intensity of the induced carrier signal in the first grid conductor does not exceed that of both the second and third grid conductors, then differentially sensing a plurality of the grid conductors near the first, second, and third grid conductors and finding a seventh grid conductor conducting an induced carrier signal the intensity of which exceeds that of an adjacent grid conductor on either side thereof, and repeating step (b) for the seventh grid conductor and the adjacent grid conductors on either side thereof, and then repeating step (c) for the intensities of the induced carrier signals in the seventh grid conductor and the adjacent grid conductors on either side thereof, respectively.

8. The method of claim 7 including determining if the intensity of the induced carrier signal in the first grid conductor exceeds that of the second or third grid conductors, and if it does, then sensing, in a single ended mode, the intensity of the induced carrier signal in the seventh grid conductor and an eighth grid conductor located the preselected distance from the seventh, and returning to step (b) if the intensity of the induced carrier signal in the seventh grid conductor exceeds that of the eighth grid conductor, and otherwise returning to step (a).

9. The method of claim 5 including, after step (a), determining if the intensity of the induced carrier signal in the first grid conductor exceeds a preselected level, and if it does not, returning to step (a).

10. The method of claim 9 including sensing the induced carrier signals in the plurality of grid conductors in a differential mode if the maximum intensity of the induced carrier signal in the first grid conductor exceeds the preselected level, and returning to step (a) if the intensity sensed in the differential mode does not exceed the preselected level, and otherwise going to step (b).

11. A digitizing system for operation in an environment of high ambient electrical noise, comprising in combination:
    (a) a digitizing tablet;
    (b) a pointing device for transmitting a carrier signal to a plurality of grid conductors in the tablet, the grid conductors in the tablet conducting carrier signals induced by the transmitted carrier signal, and the ambient electrical noise inducing noise signals in the grid conductors, the induced noise signals modulating the induced carrier signals;
    (c) a noise reference conductor located away from the pointing device and conducting an induced noise signal in response to the ambient electrical noise;
    (d) means for differentially sensing the induced carrier signal in a first grid conductor and the induced noise signal in the noise reference conductor to produce a substantially unmodulated output carrier signal representative of the closeness of the first grid conductor to the pointing device;

(e) circuitry responsive to the output carrier signal and determining a location of the pointing device relative to the tablet.

12. The digitizing system of claim 11 wherein the noise reference conductor is a grid conductor parallel to and spaced a preselected distance from the first grid conductor.

13. A method of reducing effects of ambient electrical noise in a digitizing system, the method comprising the steps of:
   (a) sequentially transmitting a carrier signal from a plurality of grid conductors, respectively, in a tablet to a signal receiving conductor connected to a pointing device;
   (b) inducing a portion of the transmitted carrier signal in the signal receiving conductor to produce therein an induced carrier signal and also inducing electrical noise signals in the signal receiving conductor and the grid conductors in response to the ambient electrical noise;
   (c) simultaneously with step (b), inducing an electrical noise signal in a noise reference conductor located away from the signal receiving conductor in response to the ambient electrical noise;
   (d) differentially sensing the induced carrier signal the electrical noise signal in the noise reference conductor to produce an output carrier signal representative of the closeness of a transmitting grid conductor to the signal receiving conductor or a command from the pointing device without appreciable amplitude modulation of the output carrier signal due to the ambient electrical noise;
   (e) conducting the output carrier signal to a tablet processing circuit which operates on the output carrier signal to determine a location of the signal receiving conductor relative to the tablet or discriminate a command represented by a frequency of the output carrier signal.

14. A digitizing system for operation in an environment of high ambient electrical noise, comprising in combination:
   (a) a pointing device having a signal receiving conductor;
   (b) a digitizing tablet for sequentially transmitting a carrier signal from a plurality of grid conductors, respectively, in the tablet to the signal receiving conductor and producing an induced carrier signal therein, the grid conductors in the tablet conducting carrier signals and induced noise signals, the induced noise signals modulating the carrier signals;
   (c) a noise reference conductor located away from the signal receiving conductor and conducting an induced noise signal in response to the ambient electrical noise.
   (d) means for differentially sensing the induced carrier signal and the induced noise signal to produce a substantially unmodulated output carrier signal representative of the closeness of a transmitting grid conductor to the signal receiving conductor;
   (e) circuitry determining a location of the signal receiving conductor relative to the tablet in response to the output carrier signal.

* * * * *